(12) United States Patent
Hermes (10) Patent No.: US 7,210,801 B1
(45) Date of Patent: May 1, 2007

(54) MIRROR ASSEMBLY FOR INTEGRATION WITH VEHICLE TAILGATE

(76) Inventor: Jessie L. Hermes, 217 River Bluff, Castroville, TX (US) 78009

( * ) Notice: Subject to any disclaimer, the term of this patent is extended or adjusted under 35 U.S.C. 154(b) by 0 days.

(21) Appl. No.: 10/370,194

(22) Filed: Feb. 20, 2003

(51) Int. Cl.
G02B 5/08 (2006.01)

(52) U.S. Cl. ..................................... 359/844
(58) Field of Classification Search ............... 358/844, 358/841, 870, 871
See application file for complete search history.

(56) References Cited

U.S. PATENT DOCUMENTS 5,111,342 A * 5/1992 Quesada ..................... 359/872
5,784,213 A * 7/1998 Howard ...................... 359/872
5,971,555 A * 10/1999 Wilcox et al. .............. 359/872

* cited by examiner

Primary Examiner—Euncha P. Cherry
(74) Attorney, Agent, or Firm—Wayne J. Colton, Inc.

(57) ABSTRACT

A mirror assembly for integration with a vehicle tailgate has a hatch assembly, upon which is mounted a preferably convex mirror, which is dependently secured through a plurality of arms to a rotating shaft mounted within an interior space of the tailgate. An actuator assembly is provided for rotating the shaft, thereby positioning the mirror either in a first position substantially above and outward from the tailgate, when in use, or secure within the tailgate, when in storage.

26 Claims, 9 Drawing Sheets

MIRROR ASSEMBLY FOR INTEGRATION WITH VEHICLE TAILGATE

FIELD OF THE INVENTION

The present invention relates to motor vehicles. More particularly, the invention relates to a mirror assembly for integration with the tailgate of a motor vehicle for facilitating hitching of the motor vehicle to a trailer.

BACKGROUND OF THE INVENTION

Backing a vehicle to a trailer is an all too well known frustration to commercial and recreational drivers alike. Because the trailer is typically outside of the view of the driver, all but the most skilled of drivers typically require multiple attempts before finally properly aligning the hitch with the trailer. Additionally, an error in judgement can easily result in collision of the vehicle with the trailer, resulting in financial loss in addition to the frustration inherent to the task.

As a result, others have proposed the use of an additional mirror to aid in this task. Unfortunately, the heretofore-proposed solutions have involved either the permanent attachment of a mirror to the outside of a vehicle's tailgate or the temporary affixation of such a mirror with suction cups, clamps or the like. In the former case, the mirror is subject to damage when not needed, causes permanent damage to the tailgate's aesthetic appearance and may interfere with ordinary operation of the tailgate. In the latter case, the driver of the vehicle must engage in the additional task of affixing the mirror to the tailgate whenever needed and, if the mirror is to be affixed with suction cups or the like, the tailgate must be relatively free dirt. Additionally, the temporarily affixed mirror may come loose inadvertently, thereby only compounding the frustration of an already frustrating task.

It is therefore an overriding object of the present invention to improve upon the prior art by providing a method and apparatus whereby an additional mirror may be selectively deployed from within a tailgate such that the mirror is readily available when needed and readily stored when not needed. It is a further object of the present invention to provide such a method and apparatus whereby the aesthetic appearance of the tailgate as well as the tailgate's functionality remain in tact notwithstanding the presence of the mirror. Finally it is an object of the present invention to provide such a method and apparatus that may be economically implemented either as an option at time of purchase or as an after market modification.

SUMMARY OF THE INVENTION

In accordance with the foregoing objects, the present invention—a mirror assembly for integration with a vehicle tailgate—generally comprises a hatch assembly, upon which is mounted a preferably convex mirror, which is dependently secured through a plurality of arms to a rotating shaft mounted within an interior space of the tailgate. An actuator assembly is provided for rotating the shaft, thereby positioning the mirror either in a first position substantially above and outward from the tailgate, when in use, or secure within the tailgate, when in storage.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring now to the figures, the present invention is shown to generally comprise a mirror deployment assembly 35 integrated within the tailgate 20 of a utility vehicle such as, for example, a pickup truck. As will be better understood further herein, the mirror deployment assembly 35 comprises a hatch assembly 36, upon which is mounted a preferably convex mirror 40, which is dependently secured through a plurality of arms 42 to a rotating shaft 41 mounted between a plurality of mirror frame weldments 24 held in place with bolts 25 or other conventional mounting means between the lower frame 21 and the upper frame 22 typically provided within conventional tailgates. An actuator assembly 43 is provided for rotating the shaft 41, thereby positioning the mirror 40 either in a first position substantially above and outward from the tailgate 20, when in use, or secure within the tailgate 20, when in storage.

Figure 1:
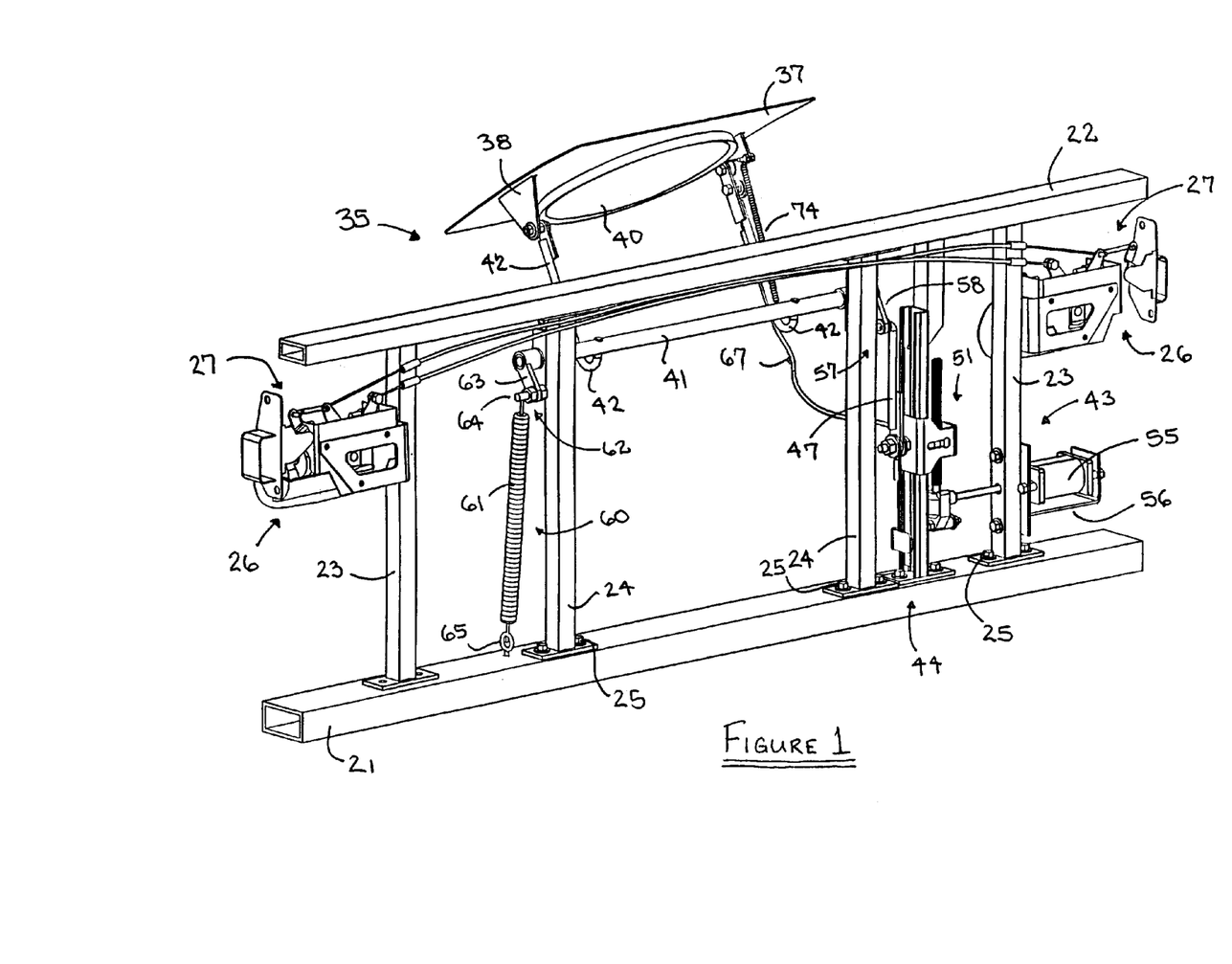
FIG. 1 shows, in a partially cutaway cab-side perspective view, the preferred embodiment of the mirror assembly of the present invention.
Figure 2:
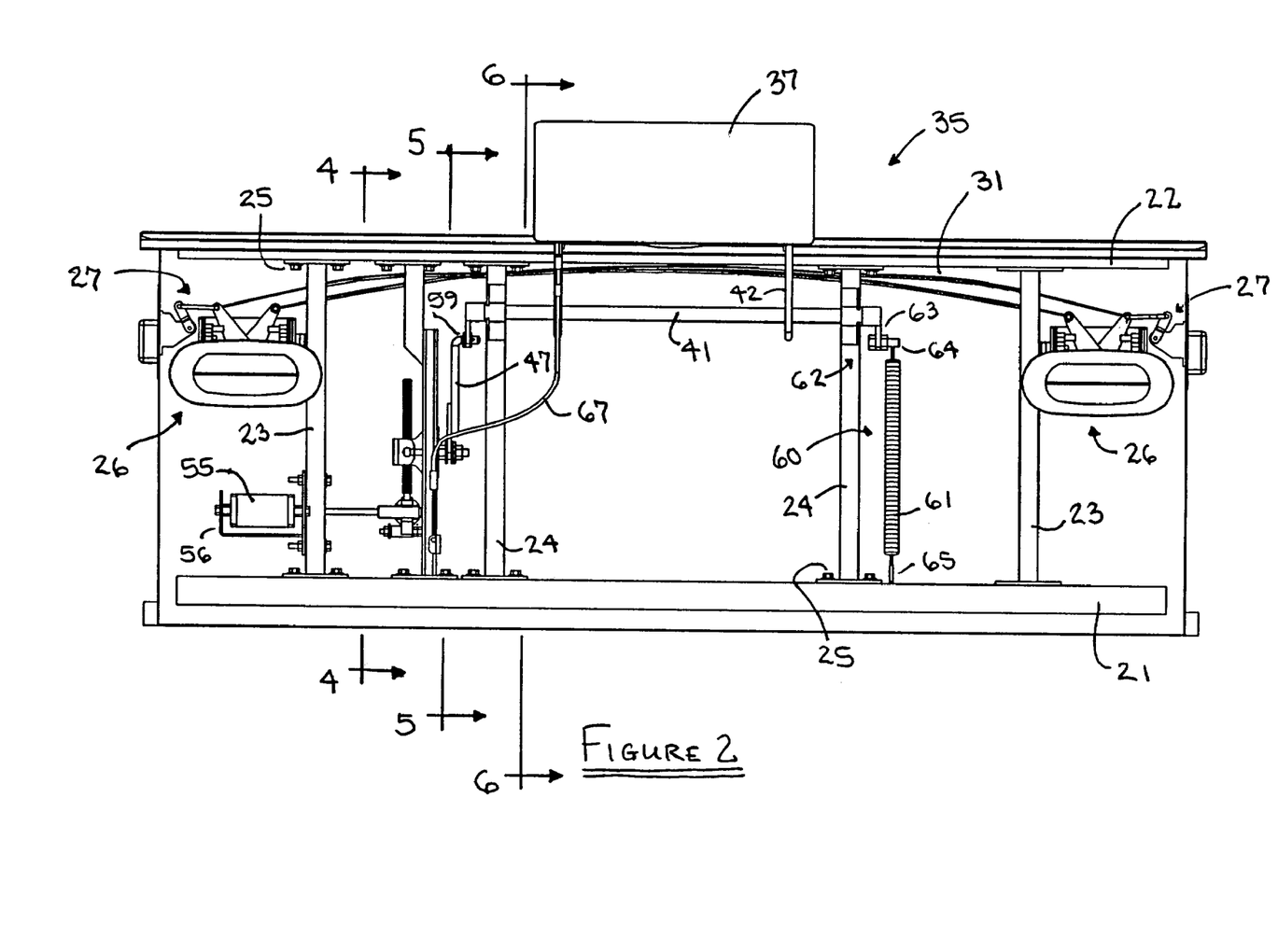
FIG. 2 shows, in a partially cutaway hitch-side elevational view, the mirror assembly of FIG. 1.
Figure 3:
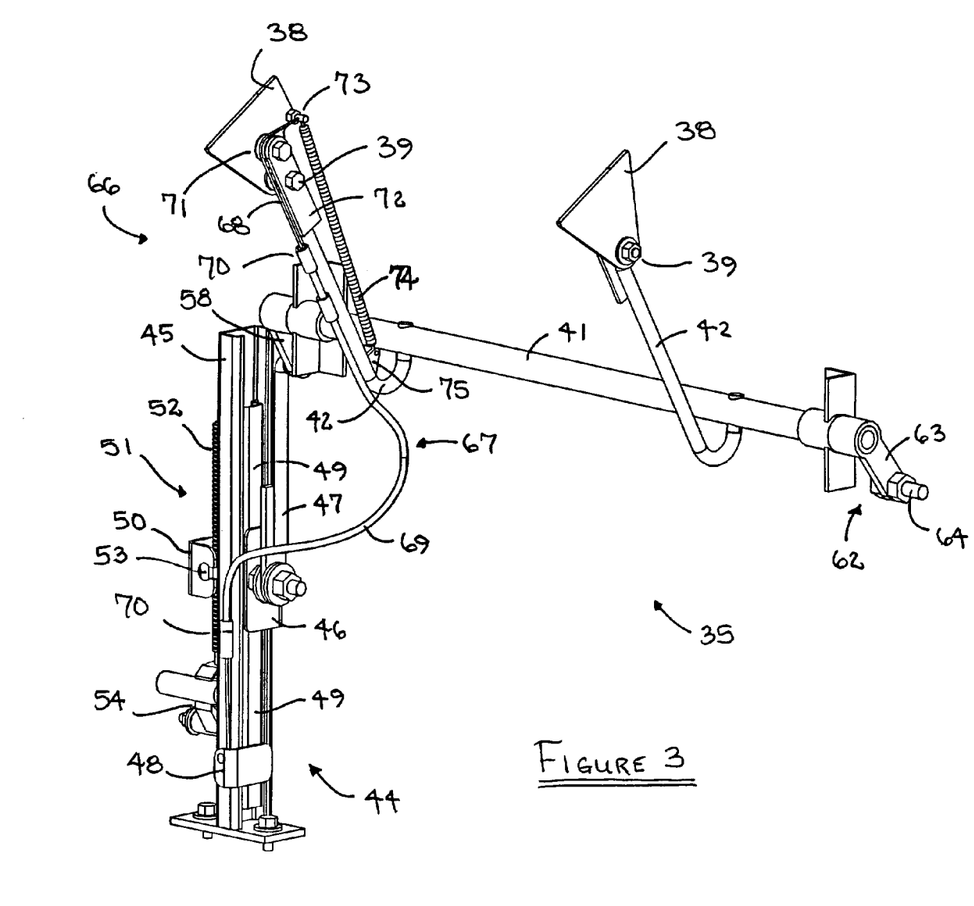
FIG. 3 shows, in a partially cutaway hitch-side perspective view, various details of the mirror assembly of FIG. 1.
Figure 4:
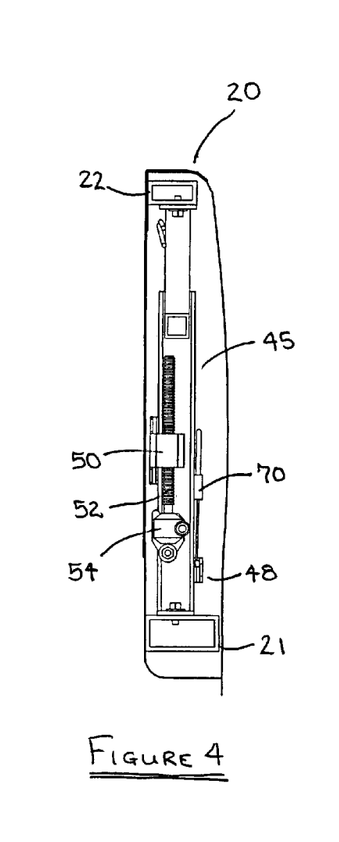
FIG. 4 shows, in a cross-sectional side view taken through line 4—4 of FIG. 2, various details of the actuation assembly of the mirror assembly of FIG. 1.
Figure 5:
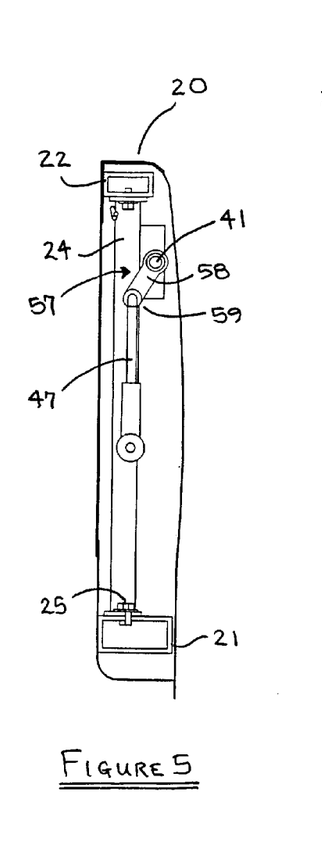
FIG. 5 shows, in a cross-sectional side view taken through line 5—5 of FIG. 2, various further details of the actuation assembly of the mirror assembly of FIG. 1.
Figure 6:
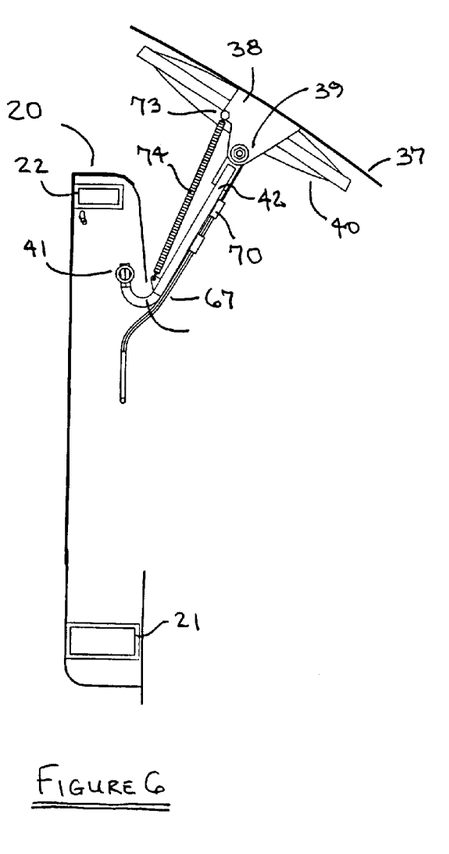
FIG. 6 shows, in a cross-sectional side view taken through line 6—6 of FIG. 2, various still further details of the actuation assembly of the mirror assembly of FIG. 1.

As particularly shown in FIGS. 1 through 3, the hatch assembly 36 generally comprises a hatch 37 upon which the mirror 40 and a plurality of pivot plates 38 are secured. The pivot plates 38 each comprise a pivot 39, which may simply comprise a bolt assembly, in which the hatch assembly 36 is mounted to the arms 42 extending from the shaft 41. In this manner, as will be in better understood further herein, the hatch assembly 36 may rotate with respect to the arms 42 such that the mirror 40 may be correctly positioned upon opening of the hatch assembly 36 for use.

As generally shown in the figures and particularly shown in FIGS. 3 through 6, the actuator assembly 43 generally comprises a slide assembly 44 operable by a screw assembly 51. In particular, the slide assembly 44 comprises a rail 45, which may be C-shaped, having an internal wiper 49 slidingly provided therein. In the preferred embodiment of the present invention, the wiper 49 has affixed thereto an upper slide 46 and a lower slide 48. An actuator rod 47 is connected to the upper slide 46 at one end and, through an actuator linkage 57, which may simply comprise an arm 58 having a grommet 59 therethrough, at its other end to the shaft 41.

The screw assembly 51 generally comprises a screw 52 rotated by a drive motor 55, which may be mounted upon a motor mounting bracket affixed to one of the outer transverse weldments 23 held in place with bolts 25 or other conventional means between the lower frame 21 and the upper frame 22 of the tailgate 20. As shown in the figures, a step-down gearbox 54, preferably affixed to the slide assembly 44, is provided for interfacing the screw 52 to the drive motor 55. In this manner, the drive motor 55 may be operated at a much faster speed than rotates the screw 52, thereby increasing the torque obtained from the rotating screw 52. Additionally, the gearbox 54 may be provided with an internal clutch in order to prevent damage to the drive motor 55 upon full extension or full closure of the hatch assembly 36. In any case, a travelling nut 53 rides up and down upon the screw 52 to raise and lower the wiper 49 through a provided slide coupling 50. In this manner, actuation of the drive motor 55 serves to raise and lower the upper slide 46 and actuator rod 47 for rotation of the shaft 41. Rotation of the shaft 41, in turn causes the arms 42 to swing out away from or in toward the tailgate 20, thus deploying or replacing the hatch assembly 36.

In order to ensure that the hatch assembly 36 deploys and replaces smoothly, the preferred embodiment of the present invention comprises a counterbalance 60 at the arm 42 opposite the actuator assembly 43. In particular, as shown in FIGS. 1 and 2, the counterbalance 60 comprises a spring 61 in tension between an eyebolt 65 affixed to the lower frame 21 of the tailgate 20 and a counterbalance linkage 62, comprising an arm 63 and bolt 64, at the end of the shaft 41 opposite the actuator linkage 57.

As previously discussed, the hatch assembly 36 is mounted to the arms 42 extending from the shaft 41 about a plurality of pivots 39, thereby allowing the hatch assembly 36 to rotate with respect to the arms 42. In order to correctly position the mirror 40 upon deployment of the hatch assembly 36, a mirror position assembly 66 is provided. As particularly shown in FIG. 3, the mirror position assembly generally comprises a spring 74 against the force of which operates a mirror position cable 67.

As shown in the figure, the spring 74, which attaches between a spring attachment plate 75 affixed to one of the arms 42 and a spring and cable mount 73 affixed to the corresponding pivot plate 38, biases the hatch assembly 36 in a first rotational direction. The mirror position cable 67, which comprises an inner cable 68 housed within a sheath 69 terminating in a plurality of ferrules 70 fixed to the arm 42 and rail 45, is arranged to counteract the force of the spring 74 upon opening of the hatch assembly 36. In particular, one end of the inner cable 68 is affixed to the lower slide 48 of the slide assembly 47 such that downward movement of the wiper 49 causes the inner cable 68 to be pulled. The opposite end of the inner cable 68 is routed about a sheave 71 dependently affixed to a sheave mounting plate 72 at the end of the arm 42 such that pulling upon the first end of the inner cable 68 causes the hatch 37 to rotate generally downward as the hatch assembly 36 is deployed. Upon replacement of the hatch assembly 36 for storage of the mirror 40 within the tailgate 20, tension on the inner cable 68 is relaxed as the wiper 49 moves upwardly in the rail 45, thereby allowing the spring 74 to position the hatch 37 for flush mounting within the tailgate 20.

Figure 7:
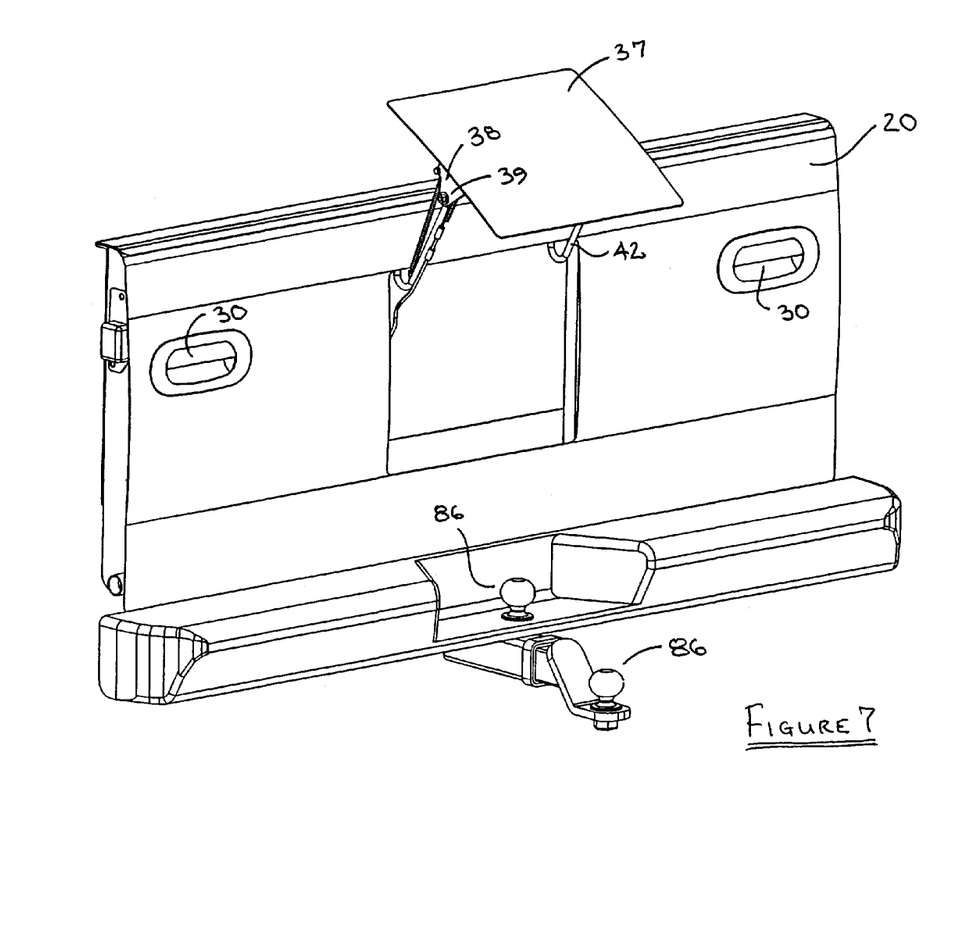
FIG. 7 shows, in a hitch-side perspective view, the mirror assembly of FIG. 1 as deployed for use.
Figure 8:
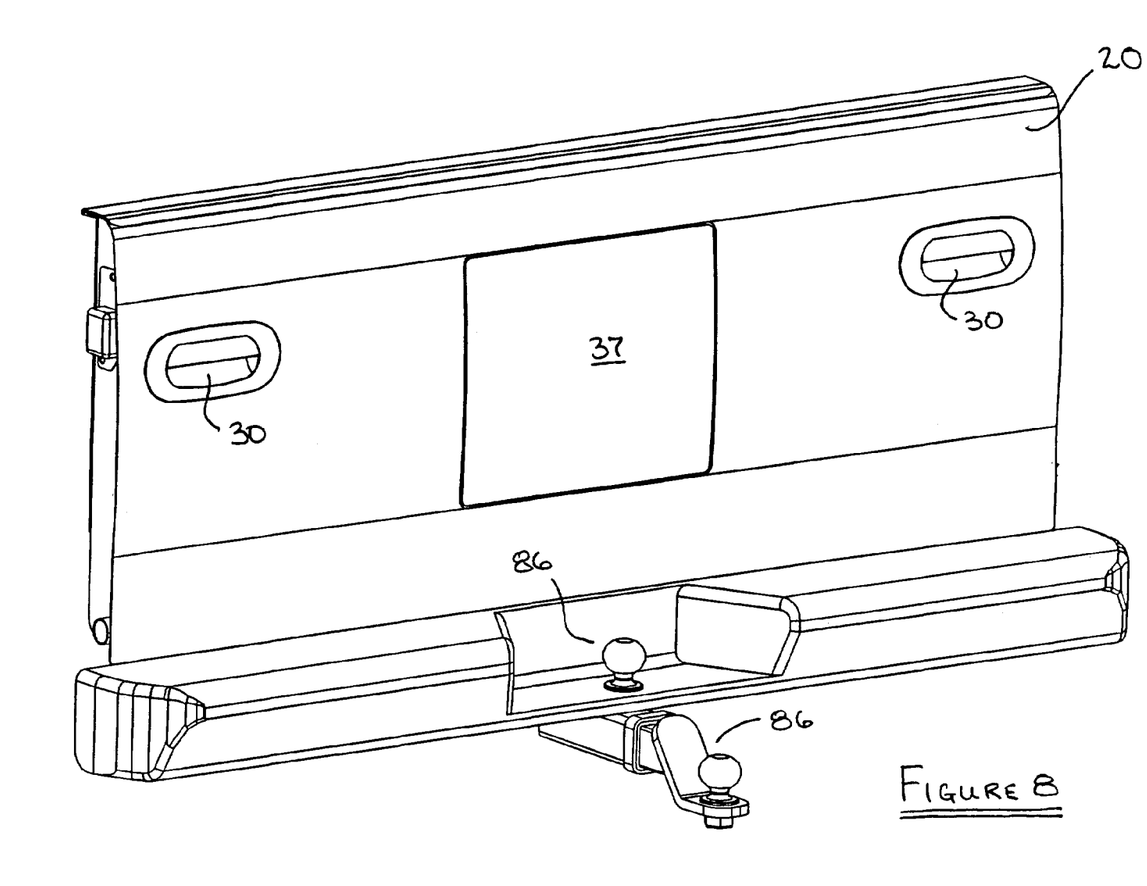
FIG. 8 shows, in a hitch-side perspective view, the mirror assembly of FIG. 1 as stowed for protective storage.

As shown in FIGS. 7 and 8, the described assemblies of the present invention cooperate to enable selective deployment of the hatch assembly 36 in order that the mirror 40 may be utilized by the vehicle operator to view the trailer hitch 86 while backing the vehicle to a trailer. In this manner, it is to be expected that the operator of the vehicle may save much time and avoid frustration in performance of an otherwise tricky task. Upon hooking the trailer to the vehicle's trailer hitch 86, the hatch assembly 36 is then quickly and conveniently stored within the tailgate 20, thereby protecting the mirror 40 from inadvertent damage.

Figure 9:
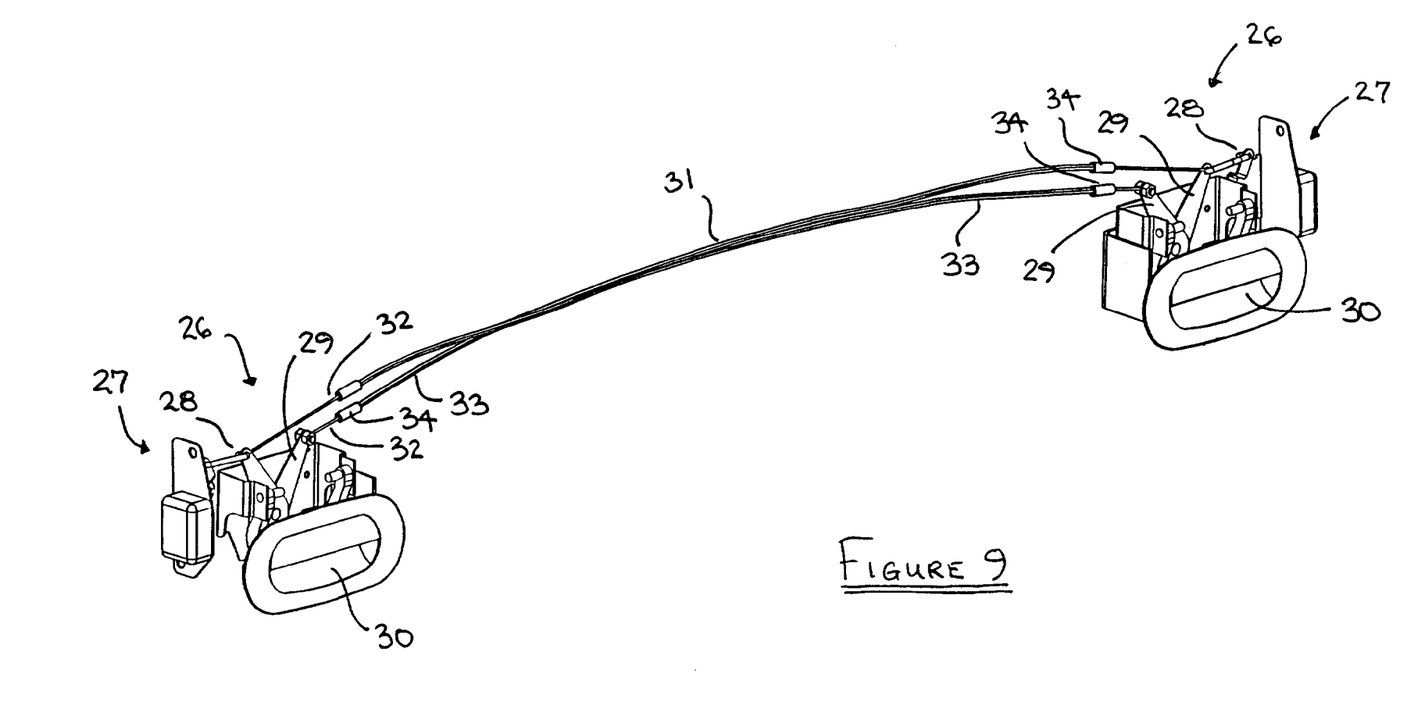
FIG. 9 shows, in a perspective view, details of a latch mechanism that is particularly useful with the mirror assembly of FIG. 1.

As shown in FIG. 9, the present invention also contemplates the provision of multiple handle assemblies 26 such that the tailgate 20 may be operable from either side of the vehicle notwithstanding placement of the mirror deployment assembly 35 centrally within the tailgate 20. In particular, a plurality of handle interconnection cables 31 is provided to interconnect the latch assemblies 27 disposed in each of the outer edge areas of the tailgate 20. The handle interconnection cables 31, each of which comprises and inner cable 32 within a sheath 33 terminating in a ferrule 34 affixed to a respective one of the outer transverse weldments 23, attached by their inner cables 32 to a plurality of rabbit ears 29 operably attached to the latch lever 28 of each latch assembly 27. As will be appreciated by those of ordinary skill in the art, such interconnection allows operation of both latch assemblies 27 through either of the two handles 30.

Figure 10:
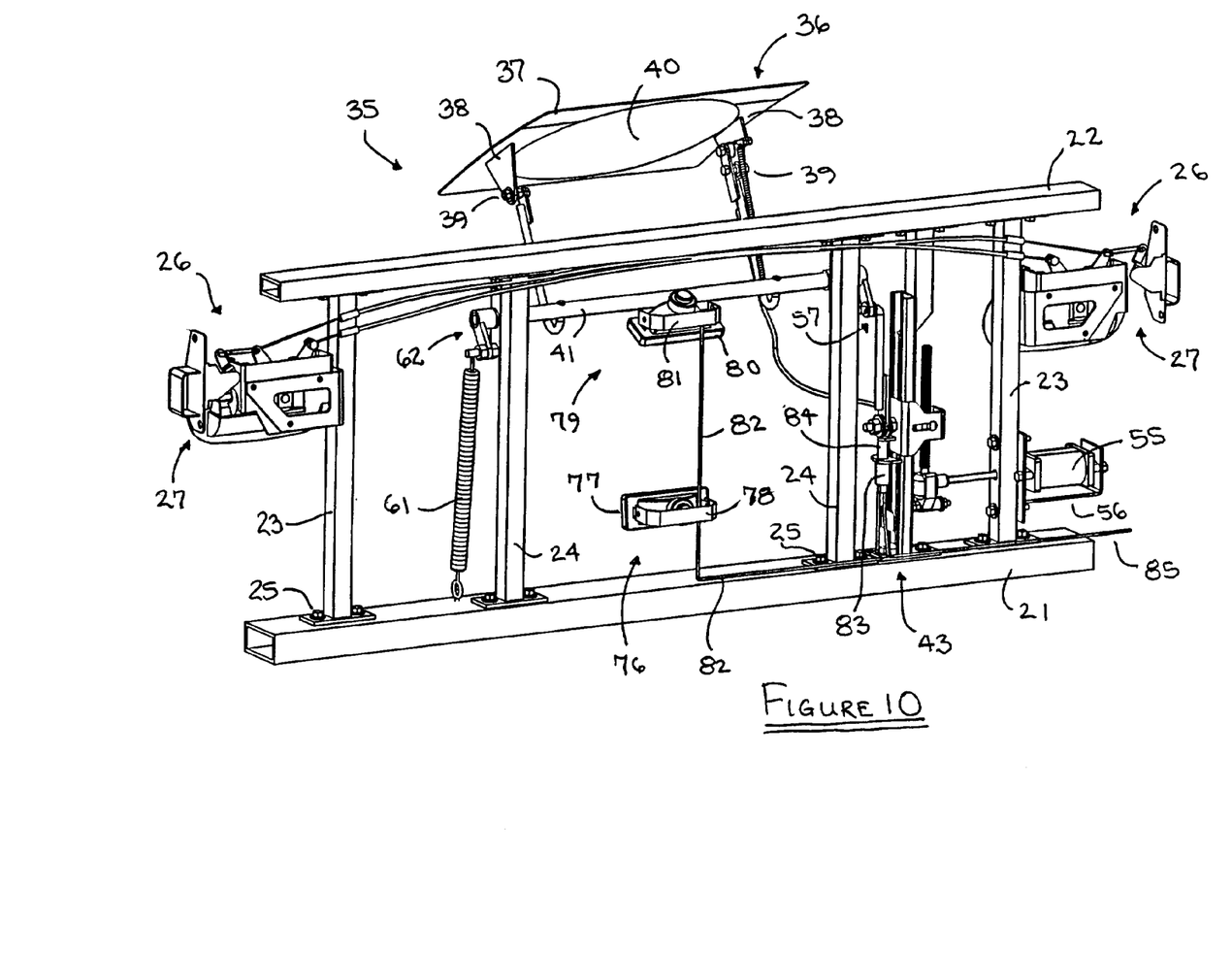
FIG. 10 shows, in a partially cutaway cab-side perspective view, the mirror assembly of FIG. 1 with various additional features incorporated therein.
Figure 11:
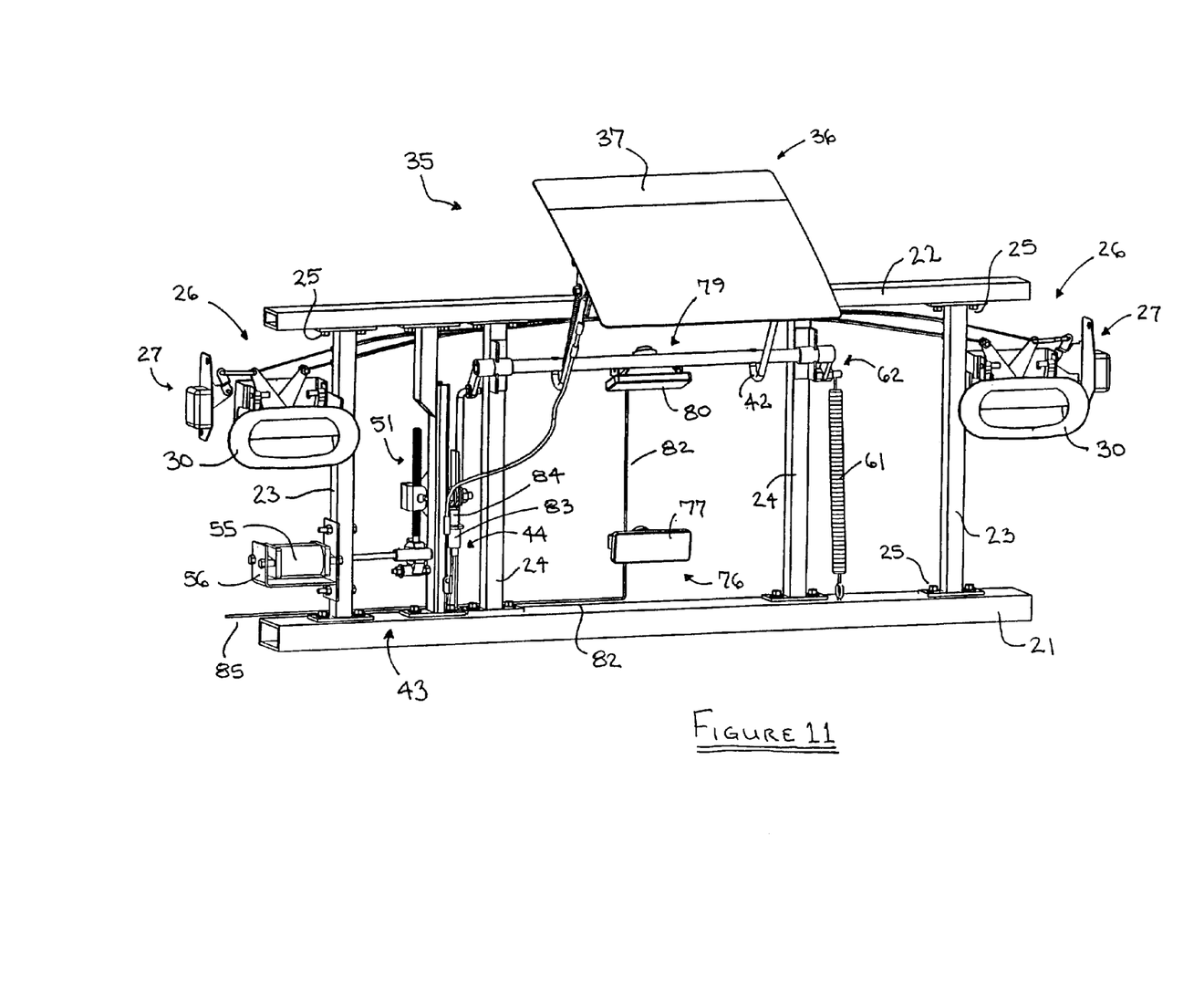
FIG. 11 shows, in a partially cutaway hitch-side perspective view, the mirror assembly of the present invention with the various additional features of FIG. 10 incorporated therein.

Finally, the present invention also contemplates the provision of a back-up light assembly 76, comprising a lamp 77 affixed through a conventional 78 within the tailgate 20, and/or a hitch light assembly 79, comprising a lamp 80 also affixed with a conventional mount 81 within the tailgate 20. Preferably, wiring 82 for either or both such assemblies 76, 79 next to supply wiring 85 through a plunger switch 83, which may be mounted to the rail 45 of the slide assembly 44 and operated upon deployment of the hatch assembly 36 by a piston 84 affixed to the upper slide 46.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, the plunger switch 83 may be mounted in any of a variety of positions such that the switch 83 is operable upon deployment of the hatch assembly 36 or the plunger 83 may be replaced with a manually operated switch located within the cab of the vehicle or elsewhere. In any case, because the scope of the present invention is much broader than any particular embodiment, the foregoing detailed description should not be construed as a limitation of the scope of the present invention, which is limited only by the claims appended hereto.

What is claimed is:

1. A vehicle tailgate assembly for providing enhanced visibility from the cab of a vehicle to the hitch of the vehicle, said tailgate assembly comprising:
   a vehicle tailgate having an interior space therein;
   a mirror assembly permanently affixed to said vehicle tailgate, said mirror assembly having provided thereon a mirror; and
   wherein said mirror assembly is deployable from a first location within said interior space to a second location external to said tailgate such that said mirror assembly is substantially concealed within said vehicle tailgate when in said first location and said mirror is positioned in sight of both the cab and the hitch of the vehicle when said mirror assembly is in said second location.

2. The vehicle tailgate assembly as recited in claim 1, wherein said mirror assembly comprises a hatch assembly rotatably mounted about a shaft through said interior space.

3. The vehicle tailgate assembly as recited in claim 2, said vehicle tailgate assembly further comprising a motor within said vehicle tailgate, said motor being adapted to rotate said shaft.

4. The vehicle tailgate assembly as recited in claim 3, wherein said motor is operably connected to said shaft through an actuator assembly.

5. The vehicle tailgate assembly as recited in claim 4, wherein:
   said actuator assembly comprises a slide assembly having an actuator rod slidingly affixed to a rail, said rod being operably interconnected with said shaft; and
   wherein said motor is operably interconnected to said slide assembly to cause linear translation of said actuator rod.

6. The vehicle tailgate assembly as recited in claim 5, wherein said actuator assembly further comprises a screw assembly for operably interconnecting said motor to said slide assembly.

7. The vehicle tailgate assembly as recited in claim 6, wherein said screw assembly comprises:
   a rotating screw; and
   a traveling nut about said rotating screw, said traveling nut being interconnected with said actuator rod.

8. The vehicle tailgate assembly as recited in claim 2, said vehicle tailgate assembly further comprising a mirror position assembly, said mirror position assembly being adapted to automatically locate said mirror in a predetermined orientation upon deployment of said mirror assembly from said first position to said second position.

9. The vehicle tailgate assembly as recited in claim 1, said vehicle tailgate assembly further comprising a light assembly operable upon deployment of said mirror assembly from said first position to said second position.

10. The vehicle tailgate assembly as recited in claim 9, wherein said light assembly is adapted to illuminate a space generally backward from the vehicle.

11. The vehicle tailgate assembly as recited in claim 9, wherein said light assembly is adapted to illuminate a space generally toward the hitch of the vehicle.

12. The vehicle tailgate assembly as recited in claim 9, said vehicle tailgate assembly further comprising a plurality of light assemblies operable upon deployment of said mirror assembly from said first position to said second position.

13. The vehicle tailgate assembly as recited in claim 1, said vehicle tailgate assembly further comprising two handle assemblies for opening operation of said vehicle tailgate, one each of said handle assemblies being disposed on each side of said mirror assembly and said handle assemblies being interconnected such that actuation of one said handle assembly causes actuation of the other said handle assembly.

14. A mirror assembly for integration with a vehicle tailgate, said mirror assembly comprising:
   a hatch having an exterior face and an interior side;
   a mirror affixed to said interior side of said hatch;
   at least one arm connected at one end to said hatch and adapted at the other end for swinging engagement with an interior portion of the vehicle tailgate such that upon integration with the vehicle tailgate said mirror may be substantially concealed within the tailgate or extended away from the tailgate by swinging said arm.

15. The mirror assembly as recited in claim 13, said mirror assembly further comprising a plurality of arms, each said arm being connected at one end to said hatch and adapted at the other end for swinging engagement with an interior portion of the vehicle tailgate.

16. The mirror assembly as recited in claim 15, said mirror assembly further comprising a shaft upon which is mounted the end of said arm distal said hatch.

17. The mirror assembly as recited in claim 16, said mirror assembly further comprising a motor, said motor being adapted to rotate said shaft.

18. The mirror assembly as recited in claim 17, wherein said motor is operably connected to said shaft through an actuator assembly.

19. The mirror assembly as recited in claim 18, wherein:
   said actuator assembly comprises a slide assembly having an actuator rod slidingly affixed to a rail, said rod being operably interconnected with said shaft; and
   wherein said motor is operably interconnected to said slide assembly to cause linear translation of said actuator rod.

20. The mirror assembly as recited in claim 19, wherein said actuator assembly further comprises a screw assembly for operably interconnecting said motor to said slide assembly.

21. The mirror assembly as recited in claim 20, wherein said screw assembly comprises:
   a rotating screw; and
   a traveling nut about said rotating screw, said traveling nut being interconnected with said actuator rod.

22. The mirror assembly as recited in claim 15, said mirror assembly further comprising a mirror position assembly, said mirror position assembly being adapted to automatically locate said mirror in a predetermined orientation upon swinging of said hatch away from the vehicle tailgate when said mirror assembly is integrated with the vehicle tailgate.

23. The mirror assembly as recited in claim 14, said mirror assembly further comprising a light assembly operable upon swinging of said hatch away from the vehicle tailgate when said mirror assembly is integrated with the vehicle tailgate.

24. The mirror assembly as recited in claim 23, wherein said light assembly is adapted to illuminate a space generally backward from the vehicle.

25. The mirror assembly as recited in claim 23, wherein said light assembly is adapted to illuminate a space generally toward the hitch of the vehicle.

26. The mirror assembly as recited in claim 23, said vehicle tailgate assembly further comprising a plurality of light assemblies operable upon deployment of said mirror assembly from said first position to said second position.

* * * * *